United States Patent
Cheriyath et al.

(10) Patent No.: US 8,228,911 B2
(45) Date of Patent: Jul. 24, 2012

(54) ENHANCED DATA LINK COMMUNICATION OVER IRIDIUM

(75) Inventors: Rithesh Cheriyath, Karnataka (IN); SaiGopal Tumulu, Bangalore (IN); SatyaBhaskar Payasam, Kakinada (IN)

(73) Assignee: Honeywell International Inc., Morristown, NJ (US)

( * ) Notice: Subject to any disclaimer, the term of this patent is extended or adjusted under 35 U.S.C. 154(b) by 581 days.

(21) Appl. No.: 12/233,785

(22) Filed: Sep. 19, 2008

(65) Prior Publication Data

US 2010/0074253 A1 Mar. 25, 2010

(51) Int. Cl.
*H04L 12/28* (2006.01)
(52) U.S. Cl. .................. 370/389; 370/465
(58) Field of Classification Search .......... 370/389, 370/235, 238, 464, 476, 913; 340/521
See application file for complete search history.

(56) References Cited

U.S. PATENT DOCUMENTS

| | | | |
|---|---|---|---|
| 3,945,002 A | 3/1976 | Duttweiler et al. | |
| 5,387,911 A | 2/1995 | Gleichert et al. | |
| 5,396,228 A | 3/1995 | Garahi | |
| 5,543,798 A | 8/1996 | Schuermann | |
| 5,612,958 A | 3/1997 | Sannino | |
| 6,058,186 A | 5/2000 | Enari | |
| 6,161,711 A | 12/2000 | Miceli et al. | |
| 6,289,130 B1 | 9/2001 | Cooklev | |
| 6,385,513 B1 | 5/2002 | Murray et al. | |
| 6,529,706 B1 | 3/2003 | Mitchell | |
| 6,545,601 B1 * | 4/2003 | Monroe | 340/521 |
| 6,636,166 B2 | 10/2003 | Sessions et al. | |
| 6,657,565 B2 | 12/2003 | Kampf | |
| 6,677,888 B2 * | 1/2004 | Roy | 342/36 |
| 6,812,670 B2 | 11/2004 | Minamiura et al. | |
| 6,876,315 B1 | 4/2005 | Widmer | |
| 7,085,562 B1 | 8/2006 | Holder et al. | |
| 7,113,852 B2 * | 9/2006 | Kapadia et al. | 701/33 |
| 7,177,939 B2 | 2/2007 | Nelson et al. | |

(Continued)

FOREIGN PATENT DOCUMENTS

EP 1916781 4/2008

OTHER PUBLICATIONS

"WCC Awarded State of Alaska Contract for Iridium Voice & Data Satellite Communications Solutions", PR Newswire, New York Aug. 9, 2004.*

(Continued)

*Primary Examiner* — Robert Wilson
*Assistant Examiner* — Brian O Connor
(74) *Attorney, Agent, or Firm* — Fogg & Powers LLC

(57) ABSTRACT

A method to reduce latency in a data link communication is provided. The method includes compressing a data packet to be uplinked from a ground station to an aircraft communications addressing and reporting system (ACARS) in an aircraft and determining a packet size of the data packet. The aircraft communications addressing and reporting system is configured to receive packets having a packet size less than or equal to a first threshold packet size. An Iridium router based unrestricted digital inter-working connectivity solution data service is implemented to uplink the compressed data packet if the packet size exceeds a second threshold packet size. A short burst data service is implemented to uplink the compressed data packet if the packet size is less than or equal to the second threshold packet size.

20 Claims, 8 Drawing Sheets

U.S. PATENT DOCUMENTS

| | | | |
|---|---|---|---|
| 7,205,911 B2 | | 4/2007 | Kim et al. |
| 7,218,931 B2* | | 5/2007 | Karabinis ............... 455/427 |
| 7,327,293 B2* | | 2/2008 | Foster ................... 341/103 |
| 7,398,057 B2* | | 7/2008 | Stefani et al. ............ 455/68 |
| 7,504,970 B2 | | 3/2009 | Fulcomer |
| 7,519,014 B2* | | 4/2009 | Allen et al. ............. 370/310 |
| 7,613,138 B2* | | 11/2009 | Bahl et al. ............ 370/310.2 |
| 7,904,081 B2* | | 3/2011 | Graves et al. ........... 455/431 |
| 2002/0039072 A1 | | 4/2002 | Gremmert |
| 2003/0003872 A1 | | 1/2003 | Brinkley et al. |
| 2003/0030581 A1 | | 2/2003 | Roy |
| 2003/0032426 A1 | | 2/2003 | Gilbert et al. |
| 2007/0205925 A1* | | 9/2007 | Foster ..................... 341/51 |
| 2007/0243867 A1 | | 10/2007 | Graves et al. |

OTHER PUBLICATIONS

"Application Note ICS-200-01: Introduction to ACARS Messaging Services as Implemented via Iridium satellite link", Apr. 17, 2006, International Communications Group; downloaded from http://www.icao.int/anb/panels/acp/WG/M/Iridium_swg/IRD-07/IRD-SWG07-WP08%20-%20ACARS%20APP%20NOTE.pdf on Apr. 15, 2011.*

"ICAO Technical Manual for Iridium Aeronautical Mobile Satellite (ROUTE) Service", May 19, 2006, International Communications Group; downloaded from http://www.icao.int/anb/panels/acp/wg/m/wgm11/ACP-WGM11-WP04-Draft%20Iridium%20Technical%20Specification%20Versionc%201.1%20-%20051906.pdf on Apr. 18, 2011.*

Iridium; Iridium Satellite Data Services, White Paper, Version 1.0: Jun. 2, 2003.

AEA Technical Workshop; ACARS via Iridium; Installation, Configuration and Troubleshooting; AEA Technical Workshop; Washington, D.C.; Apr. 27, 2008.

International Communications Group; Introduction to ACARS Messaging Services; Application Note ICS-200-01; Preliminary Release Apr. 17, 2006.

ARINC, Chris Young; ARINC Iridium Services; Apr. 15, 2008.

EMS SATCON; eNfusion CNX Cabin Gateway Series, Network Administrator's Guide; Revision E; Jan. 21, 2008.

European Patent Office, "European Search Report", mailed Apr. 4, 2012, Published in: EP.

* cited by examiner

ENHANCED DATA LINK COMMUNICATION OVER IRIDIUM

BACKGROUND

Data link communication systems transmit messages between aircraft and ground stations via radio or satellite. A network of ground radio stations ensure that aircraft can communicate with ground in real-time from practically anywhere in the world. Satellites are used over oceans or remote areas were no ground stations exist. Aircraft communications addressing and reporting system (ACARS) is a data link system that handles text-based information of essentially the same type as can be sent via ground-ground telex. A person or a system on board creates a message and sends it via ACARS to a system or user on the ground and vice versa. Messages are sent both automatically and manually.

There are three major components to the ACARS data link system: aircraft equipment, service providers, and ground processing systems. An ACARS communications management unit (CMU or MU) is on board the aircraft. The MU is connected to a number of other devices on board the airplane: a very high frequency (VHF) radio, a keyboard and display for the pilot master control display unit (MCDU) and a printer. In some cases, the CMU is also connected to other systems.

The data link service provider delivers a message from the aircraft to the ground station, and vice versa. The data link service provider operates a network of ACARS VHF remote ground stations (RGSs). Service providers also provide service via SATCOM and HF data link as an alternative to VHF to provide full data link capability also in remote areas or over oceans.

The ground processing system, such as Honeywell's global data centre (GDC), performs all data link-specific tasks, maintains connection with service providers, logs messages, etc. The ground processing system's data link application, such as, weather information and flight planning engine, is connected to back-end computer systems at the ground processing system. The ground processing system and ACARS together provide real-time communication between the ground and aircraft.

There are technical limitations of currently available data link communications. The ACARS data link is limited by a low-speed air/ground VHF link. Messages must be kept short, since the delivery performance decreases exponentially with message size. The maximum block size of the data link message for the ACARS data link is 220 characters or less. The average real-life performance has an end-to-end delivery time of 10-20 seconds in the uplink message, and 5-10 seconds in the downlink message. In the case of multi-block uplinks, the system experiences high latency.

Current AirSat II Iridium satellite communication systems are designed to establish connection to ACARS communications management units allowing the transfer of information to and from the ground processing system, such as Honeywell Global Data Center, using the standard Airborne Flight Information System (AFIS) protocol. The AFIS protocol has a limit on message size that can be datalinked.

SUMMARY

The present application relates to a method to reduce latency in a data link communication. The method includes compressing a data packet to be uplinked from a ground station to an aircraft communications addressing and reporting system (ACARS) in an aircraft and determining a packet size of the compressed data packet. The aircraft communications addressing and reporting system is configured to receive packets having a packet size less than or equal to a first threshold packet size. The method implements an Iridium router based unrestricted digital inter-working connectivity solution data service to uplink the compressed data packet if the packet size exceeds a second threshold packet size, and implements a short burst data service to uplink the compressed data packet if the packet size is less than or equal to the second threshold packet size.

DRAWINGS

In accordance with common practice, the various described features are not drawn to scale but are drawn to emphasize features relevant to the present invention. Like reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of data link communication systems described herein transmit messages (referred to herein as data packets) between aircraft and ground stations via an Iridium satellite, in which the message size is increased while the system latency is maintained or reduced. Embodiments of the methods to reduce latency in a data link communication described herein permit a compressed (or uncompressed) data packet to be sent from a ground station to an aircraft housing the aircraft communications addressing and reporting system via an Iridium satellite, even if the compressed (or uncompressed) data packet has a packet size greater than the packet size that the aircraft communications addressing and reporting system (ACARS) can receive. The data packet is multi-blocked into packets at an Iridium satellite transceiver in the aircraft, as necessary, so the packets sent from the Iridium satellite transceiver to the ACARS are of acceptable packet size at the ACARS.

Embodiments of the methods to reduce latency in a data link communication described herein permit a compressed (or uncompressed) data packet to be sent from an aircraft housing the aircraft communications addressing and reporting system via an Iridium satellite to a ground station, even if the compressed (or uncompressed) data packet has a packet size greater than the packet size that the aircraft communications addressing and reporting system (ACARS) can send. The packets or blocks for a message to be downlinked are received from the ACARS at the Iridium satellite transceiver, formed into a data packet at the Iridium satellite transceiver, and compressed (or not in some embodiments) so the data packet sent from the Iridium satellite transceiver to the ground station has a packet size greater than the packet size that the aircraft communications addressing and reporting system (ACARS) can send.

Figure 1:
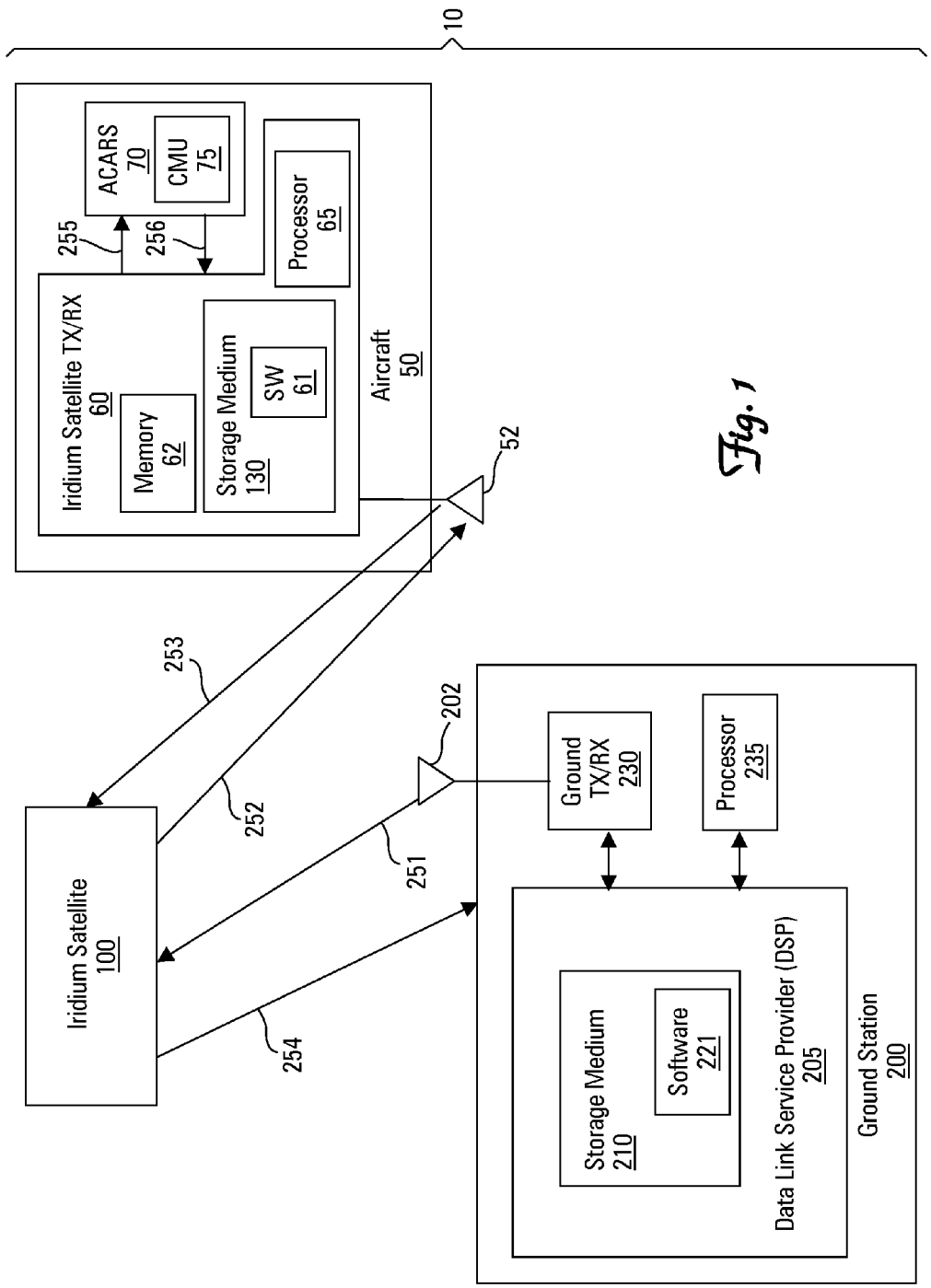
FIG. 1 shows an uplink of messages in a data link communication system in accordance with an embodiment of the present invention.

FIG. 1 shows an uplink of messages in a data link communication system 10 in accordance with an embodiment of the present invention. The data link communication system 10 is an ACARS based system. Thus, the data link communication system 10 is operable to increase the bandwidth and data service of the ACARS 70 on board an aircraft 50 by compressing the data being data-linked, by increasing the data link message block size, and by intelligently selecting either a short burst data (SBD) service or an Iridium router based unrestricted digital inter-working connectivity solution (RUDICS) data service. The intelligent selection of SBD service or an RUDICS data service is based on the size of the message, type of message, and type of uplink/downlink (that is, multi-block or single block).

The data link communication system 10 includes a ground station 200, an Iridium satellite 100, and an Iridium satellite transceiver 60 and ACARS 70 positioned in an aircraft 50. The Iridium satellite transceiver 60 includes software 61 located in a storage medium 130. The ground station 200 houses a data link service provider (DSP) 205 including software 221 located in storage medium 210. The software 221 in the data link service provider 205 in the ground station 200 and the software 61 in the Iridium satellite transceiver 60 modify all messages to be uplinked (uplinked messages) transmitted from the ground station 200 to the aircraft 50 that are longer than a first threshold packet size. In one implementation of this embodiment, the first threshold packet size is 220 bytes. In another implementation of this embodiment, the first threshold packet size is other than 220 bytes. The software 61 in the Iridium satellite transceiver 60 modifies all messages to be downlinked (downlink messages) transmitted from the aircraft 50 to the ground station 200 that are longer than a first threshold packet size. This message modification advantageously implements the capability of the Iridium satellite 100 in order to reduce the latency of the data link communication system 10. The modifications of the uplinked and downlinked messages are based on the size of the message, the type of message, and the type of uplink/downlink (i.e., multi-block or single block) as described herein.

The Iridium satellite transceiver 60 and the Iridium satellite 100 are enabled for SBD service and for RUDICS data service. The Iridium satellite transceiver 60 is communicatively coupled to the co-located ACARS 70, which includes an ACARS communications management unit (CMU) 75. In one implementation of this embodiment, the ACARS 70 includes an ACARS management unit (MU). The Iridium satellite transceiver 60 is communicatively coupled to the aircraft antenna 52. The aircraft antenna 52 is communicatively coupled to the Iridium satellite 100 via communication links 252 and 253 (uplink and down link, respectively). The Iridium satellite 100 is communicatively coupled to the ground station 200 via communication links 251 and 254 (uplink and down link, respectively). In this manner, the Iridium satellite transceiver 60 is communicatively coupled to the ground station 200.

The communication links 252 and 253 are shown as separate communication links for ease of viewing but in some embodiments they are the same wireless communication link. Likewise, the communication links 251 and 254 are shown as separate communication links but in some embodiments they are the same wireless communication link.

SBD is an efficient, packet-based service for frequent short data transmissions that typically are less than 500 bytes per transfer. The SBD service supports 1960 bytes Mobile Originated data packet (i.e., downlink data packet) and 1890 bytes Mobile Terminated data packet (i.e., uplink data packet). In SBD-based data transfer, the packet switching opens the connection just long enough to send a data packet and then closes. RUDICS is a circuit switched data service designed for transfer of data packets that typically are 500 bytes or more per transfer. In RUDICS-based data transfer, the packet switching opens a connection and keeps it open until the last bit of data for the session is sent. The circuit is pre-defined before the connection is made.

The processors 65 and 235 execute software 61 and 221, respectively, and/or firmware that causes the processors 65 and 235 to perform at least some of the processing described here as being performed by the Iridium satellite transceiver 60 and data link service provider 205, respectively. The software 61 and 221 and/or firmware executed by the processors 65 and 235, respectively, comprise a plurality of program instructions that are stored or otherwise embodied on a storage media 130 and 210, respectively, from which at least a portion of such program instructions are read for execution by the processors 65 and 235, respectively. In one implementation, the processors 65 and 235 comprise a microprocessor or microcontroller. In another implementation, the processors 65 and 235 comprise processor support chips and/or system support chips such as application-specific integrated circuits (ASICs).

As described above, the ACARS 70 is programmed to accept only messages with a packet size of 220 bytes or less while the Iridium satellite transceiver 60 is able to receive messages with a packet size greater than 220 bytes. The Iridium satellite transceiver 60 multi-blocks the messages with packet size greater than 220 bytes to increase the latency of the data link system 10. As defined herein a "length in bytes of a data packet" is the "packet size."

Figure 2:
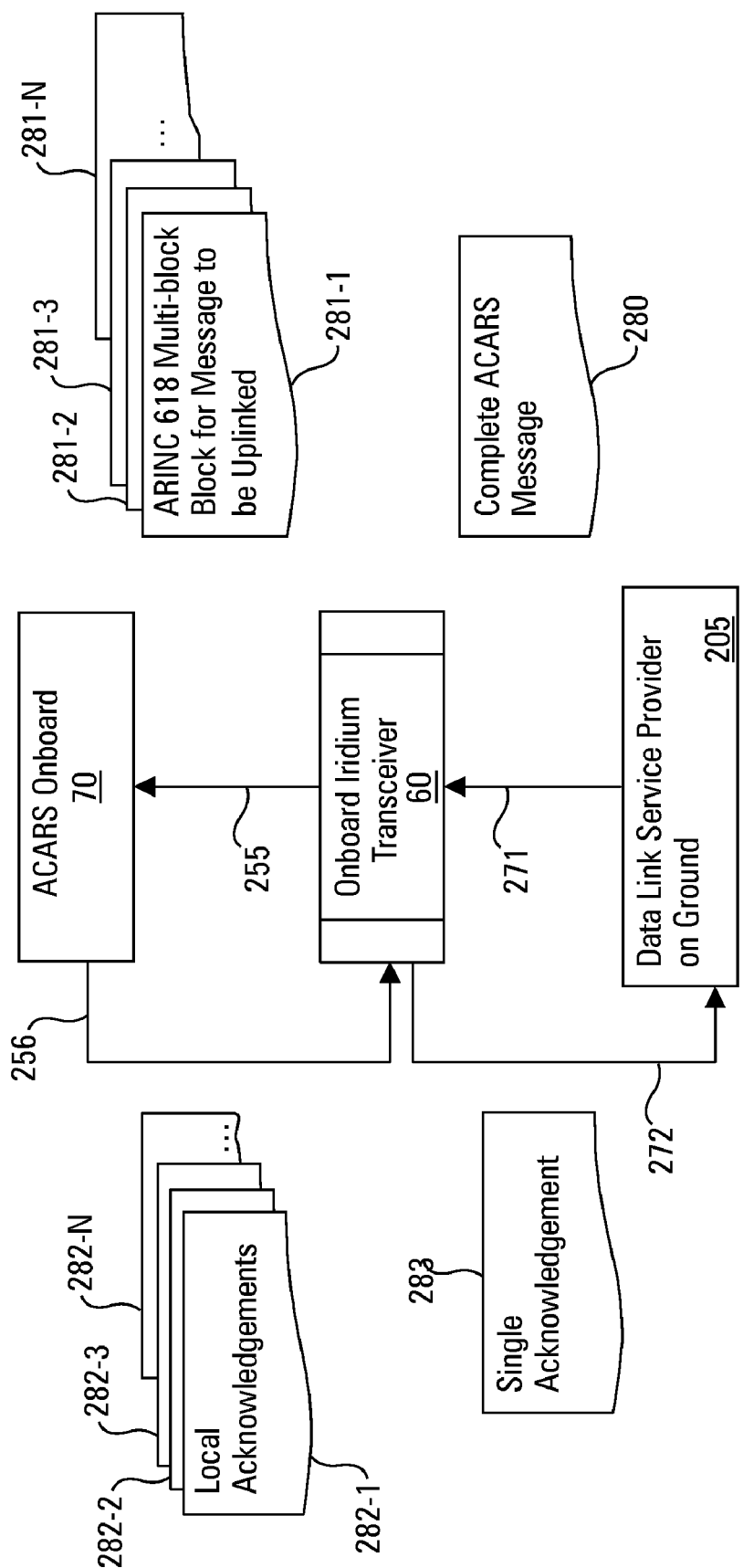
FIG. 2 shows a flow diagram for the uplink of messages and downlink of acknowledgements in the data link communication system in accordance with an embodiment of the present invention.

FIG. 2 shows a flow diagram for the uplink of messages and downlink of acknowledgements in the data link communication system 10 in accordance with an embodiment of the present invention. A data packet 280 (complete ACARS message) is generated at the data link service provider 205 (FIG. 1) and transmitted via communication link 271 to the Iridium satellite. In one implementation of this embodiment, the processor 235 executes software 221 stored in the storage medium 210 of the data link service provider 205 to compress the data packet 280. The methods described herein include the steps of compression/decompression but one skilled in the art can understand how to implement the methods described herein without the steps of compression/decompression after reading this document.

An exemplary case for a data packet 280 is compressed to X bytes in length (X is an integer) is now described. If X is less than or equal to a second threshold packet size, such as 1890 bytes (i.e., compressed data packet 280 is less than or equal to 1890 bytes in length), the processor 235 then executes software 221 to configure the data packet 280 for SBD transmission. If X is greater than the second threshold packet size 1890 (i.e., compressed data packet 280 is greater than 1890 bytes in length), the processor 235 then executes software 221 to configure the compressed data as an uplinked data packet 280 for RUDICS transmission. In one implementation of this embodiment, 1890 bytes is a second threshold packet size. In another implementation of this embodiment, the second threshold packet size is different from 1890 bytes.

The compressed data packet 280 transmitted from the ground antenna 202 is received at the Iridium satellite 100 over communication link 251. The Iridium satellite 100 sends the received data packet via communication link 252 to the aircraft 50. The communication links 251 and 252 in FIG. 1 are represented generally as a single communication link 271 in FIG. 2. The compressed data packets 280 received at the Iridium satellite transceiver 60 are decompressed by the Iridium satellite transceiver 60. If the decompressed data packet exceeds the first threshold packet size, such as 220 bytes, the data packet is segmented into a plurality of blocks 281(1-N) (ARINC 618 multi-block for message to be uplinked). The blocks 281(1-N) are also referred to herein as "packets 281 (1-N)." Each of the plurality of blocks 281(1-N) has a packet size less than or equal to 220 bytes in length. Specifically, the processor 65 executes the software 61 in the Iridium satellite transceiver 60 to decompress the data in the data packet 280 and to multi-block any decompressed data packet 280 that exceed 220 bytes into 220 byte blocks 281(1-N). In this manner, the data packet 280 is reformed as blocks 281(1-N) and the blocks 281(1-N) are sent to the ACARS 70 while the data link communication system 10 has reduced the system redundancy.

The number N of blocks 281(1-N) of 220 bytes is (X/220), where the (X/220) is rounded up to the next higher integer when (X/220) is not an integer. Thus, when the number (X/220) is an integer, all the packets have a packet length of 220 bytes. When the number (X/220) is not an integer, X/220 is rounded up to the next higher integer and the last block 281-N has a packet length of less than 220 bytes. The multi-blocked messages are sent to the ACARS 70 via communication link 255. The blocks 281(1-N) sent over communication link 255 are of packet sizes that are acceptable by the ACARS 70 for processing by the communication management unit 75. Since the data packet 280 is transmitted from the ground station to the aircraft 50 with a packet size greater than the first the threshold packet size (for example, 220 bytes), the system latency for the data link communication system 10 is reduced.

For each block 281(1-N) received at the ACARS 70, a respective local acknowledgement 282(1-N) is sent via communication link 256 to the onboard Iridium satellite transceiver 60. The local acknowledgments 282(1-N) are stored in the Iridium satellite transceiver 60 until acknowledgements 282(1-N) are received for all the blocks 281(1-N). Once all the acknowledgements 282(1-N) are received, the Iridium satellite transceiver 60 re-blocks the plurality of local acknowledgements 282(1-N) to generate a single acknowledgement 283. The single acknowledgement 283 is sent to the Iridium satellite 100 via communication link 253 and from the Iridium satellite 100 to the ground station 200 via communication link 254. The communication links 253 and 254 in FIG. 1 are shown as 272 in FIG. 2. In one implementation of this embodiment, the local acknowledgements 282(1-N) are stored in memory 62 in the Iridium satellite transceiver 60. In another implementation of this embodiment, the memory is part of the processor 65. In yet another implementation of this embodiment, the re-blocked single acknowledgement is compressed to form a compressed acknowledgement. The Iridium satellite transceiver is configured to implement the Iridium router based unrestricted digital inter-working connectivity solution data service to downlink the acknowledgement, if the packet size of the single acknowledgement is greater than a third threshold packet size, such as 1960 bytes.

In one implementation of this embodiment, the data packet 280 formed after compression is less than 1890 bytes in length, so the data link service provider 205 implements the SBD service to uplink data packet 280 to the Iridium satellite transceiver 60. In another implementation of this embodiment the data packet 280 formed after compression is greater than or equal to 1890 bytes in length, so the data link service provider 205 implements the RUDICS data service to uplink data packet 280 of to the Iridium satellite transceiver 60.

Figure 3:
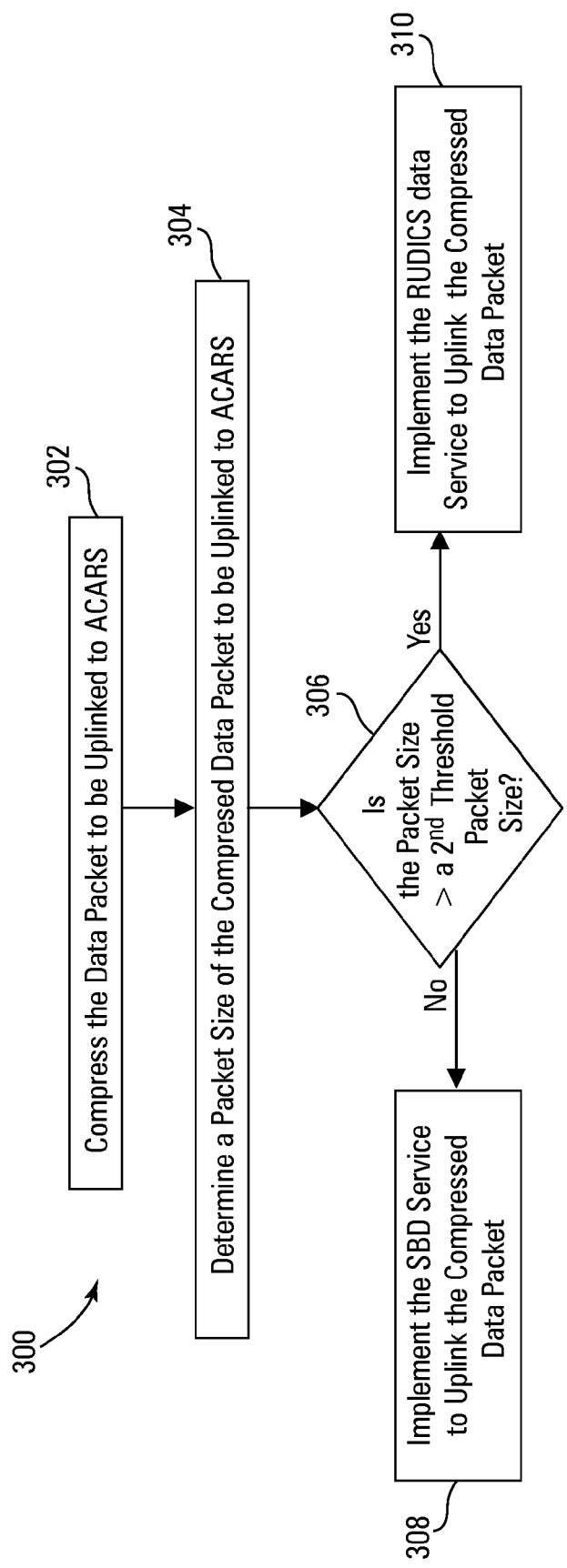
FIG. 3 is a flow diagram of a method to reduce latency in a data link communication system while uplinking data packets of increased packet size from a ground station to an aircraft in accordance with an embodiment of the present invention.

FIG. 3 is a flow diagram of a method 300 to reduce latency in a data link communication system 10 while uplinking data packets of increased packet size from a ground station 200 to an aircraft 50 in accordance with an embodiment of the present invention. In one implementation of this embodiment, the data link communication system 10 is the ACARS based system described above with reference to FIGS. 1-2. The method 300 is described with reference to the link communication system 10 shown in FIG. 1 although it is to be understood that method 300 can be implemented using other embodiments of the data link communication system as is understandable by one skilled in the art who reads this document.

At block 302, the data in the data packet to be uplinked from a ground station 200 to an aircraft communications addressing and reporting system (ACARS) 70 in an aircraft 50 is compressed. The ACARS 70 is configured to receive packets (also referred to herein as "blocks") having a packet size less than or equal to a first threshold packet size. In one implementation of this embodiment, the first threshold packet size is 220 bytes. The data packet 280 shown in FIG. 2 is an exemplary compressed data packet. At block 304, the data link service provider 205 determines the packet size of the compressed data packet, such as data packet 280. At block 306, it is determined if a packet size of the compressed data packet 280 to be uplinked from a ground station 200 to an aircraft communications addressing and reporting system (ACARS) 70 in an aircraft 50 exceeds a second threshold packet size. Specifically, the data link service provider 205 determines if the packet size of the compressed data packet 280 is greater than the second threshold packet size. If the packet size is less than or equal to the second threshold packet size, the flow proceeds to block 308 and a short burst data service is implemented to send the compressed data packet to the aircraft 50. If the packet size is greater than the second threshold packet size, the flow proceeds to block 310. At block 310, the Iridium router based unrestricted digital inter-working connectivity solution data service is implemented to send the compressed data packet 280 to the aircraft 50.

Figure 4:
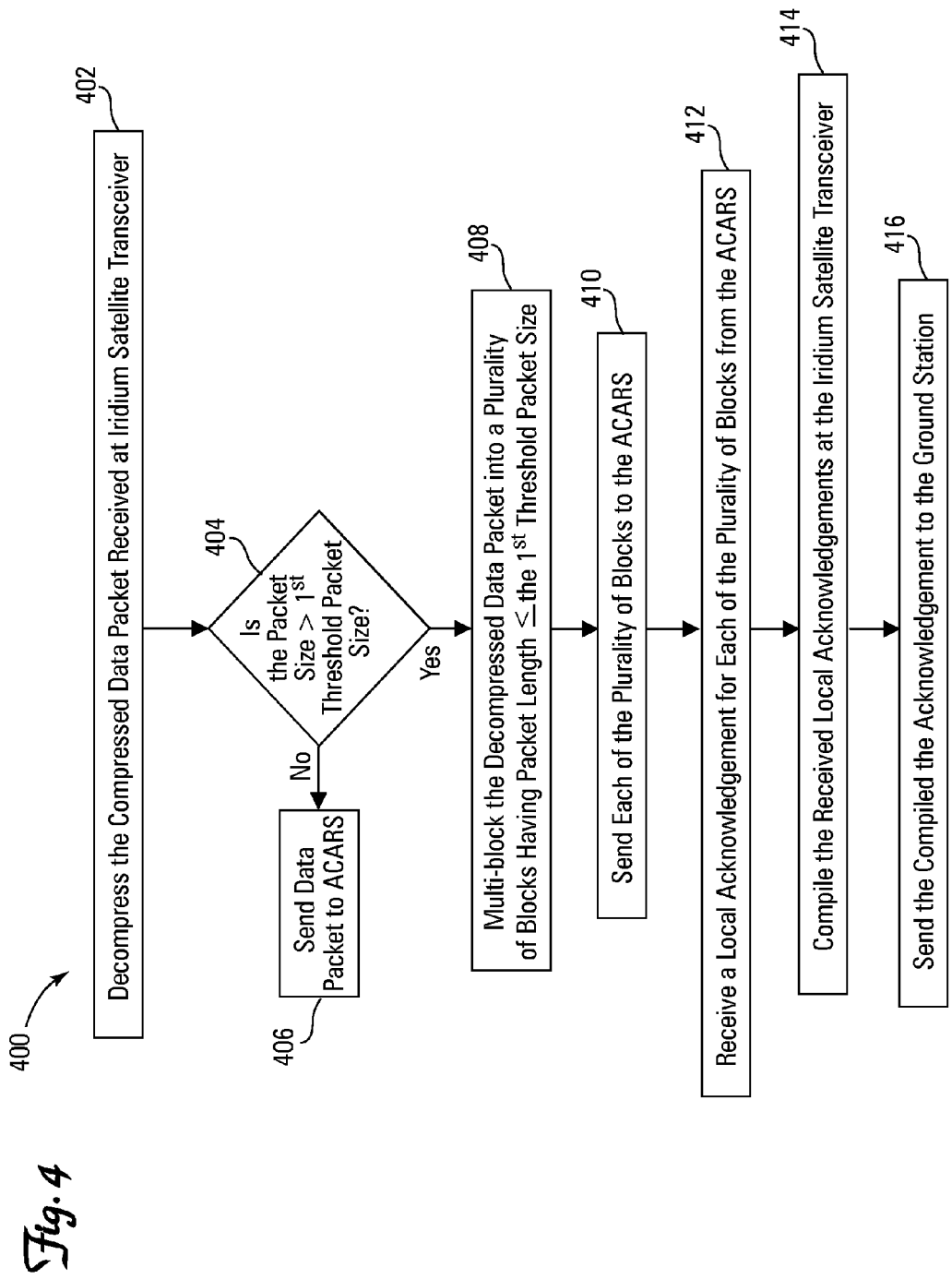
FIG. 4 is a flow diagram of a method to reduce latency in a data link communication system while uplinking data packets of increased packet size within an aircraft in accordance with an embodiment of the present invention.

FIG. 4 is a flow diagram of a method 400 to reduce latency in a data link communication system 10 while uplinking data packets of increased packet size within an aircraft 50 in accordance with an embodiment of the present invention. In one implementation of this embodiment, the data link communication system 10 is the ACARS based system described above with reference to FIGS. 1-2. The method 400 is described with reference to the link communication system 10 shown in FIG. 1 although it is to be understood that method 400 can be implemented using other embodiments of the data link communication system as is understandable by one skilled in the art who reads this document. The method 400 is implemented after the process of block 308 or 310 is implemented, as described above with reference to FIG. 3, and a data packet is sent to the Iridium satellite transceiver 60 via communication link 251, the Iridium satellite 100, and communication link 253.

At block 402, the compressed data packet received at Iridium satellite transceiver 60 in the aircraft 50 from a ground station 200 is decompressed. In one implementation of this embodiment, the packet size of the compressed data packet is greater than a first threshold packet size. At block 404, it is determined if the packet size is greater than the first threshold packet size. In one implementation of this embodiment, it is determined if the packet size is greater than 220 bytes. If the packet size is less than or equal to the first threshold packet size, the flow proceeds block 406 and the data packet is sent to ACARS 70. If the packet size is greater than the first threshold packet size, the flow proceeds block 408. At block 408, the decompressed data packet is multi-blocked into a plurality of blocks, so the number of bytes in each block is less than or equal to the first threshold packet size (such as 220 bytes). At block 410, each of the plurality of blocks or packets is sent to the ACARS 70 onboard the aircraft 50.

At block 412, a local acknowledgement 282-$i$ for each $i^{th}$ uplinked block is sequentially received at the Iridium satellite transceiver 60 from the aircraft communications addressing and reporting system 70 onboard the aircraft 50. The Iridium satellite transceiver 60 receives all of the local acknowledgements 282(1-N). At block 414, the Iridium satellite transceiver 60 compiles all of the received local acknowledgements 282(1-N). When the local acknowledgements 282(1-N) for each of the plurality of blocks 281(1-N) are compiled, block 416 is implemented. At block 416, the Iridium satellite transceiver 60 sends the compiled acknowledgement as a single acknowledgement 283 to the ground station 200. In one implementation of this embodiment, the Iridium satellite transceiver 60 compresses the compiled acknowledgement 283. In another implementation of this embodiment, the number of bytes in the single acknowledgement 283 is greater than the first threshold packet size.

Figure 5:
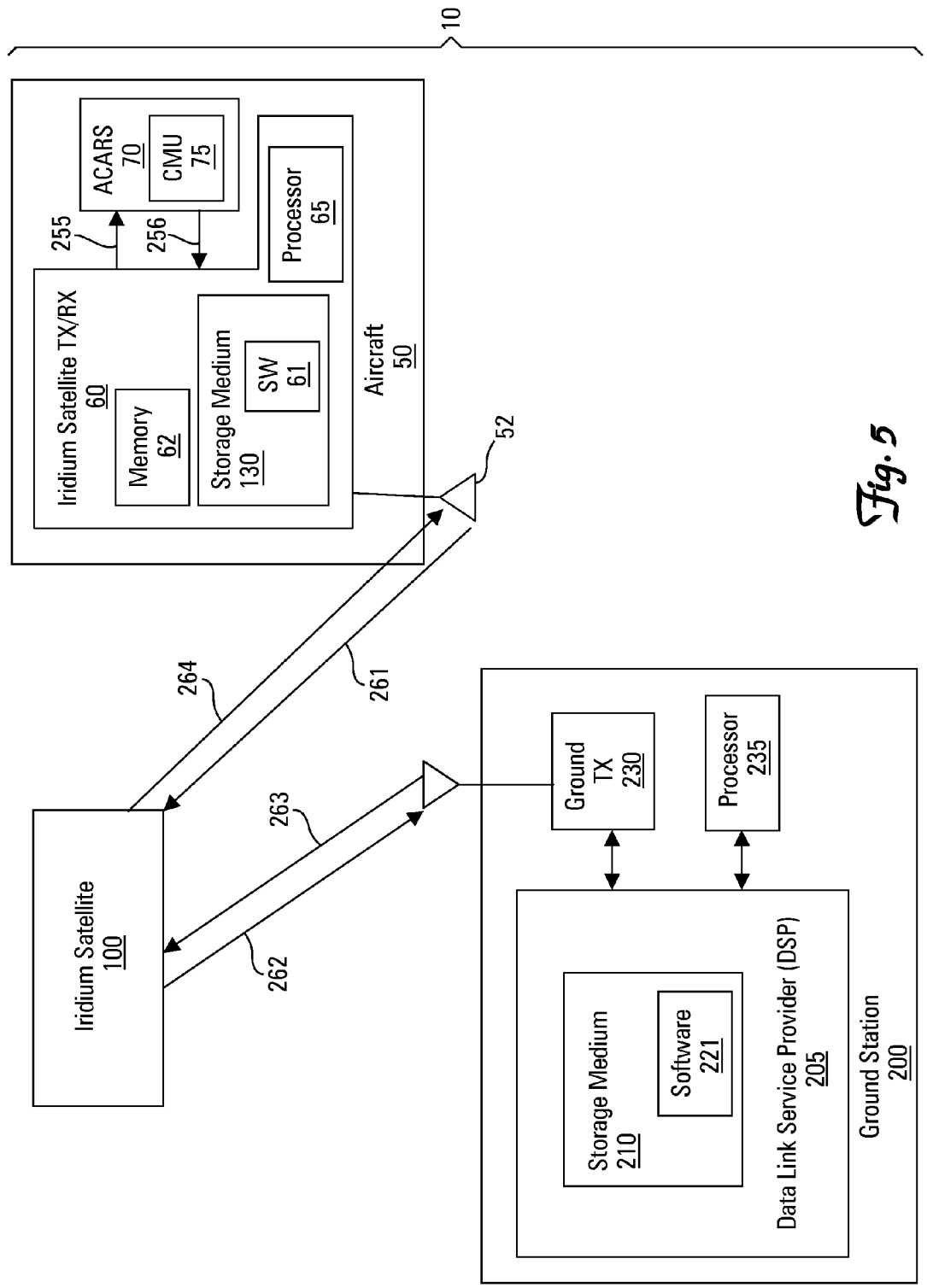
FIG. 5 shows a downlink of messages in an embodiment of a data link communication system in accordance with the present invention.

FIG. 5 shows a downlink of messages in an embodiment of a data link communication system 10 in accordance with the present invention. FIG. 5 differs from FIG. 1 in that data packets are downlinked via communication link 264 from the Iridium satellite transceiver 60 in the aircraft 50 to the Iridium satellite 100 and via communication link 262 from the Iridium satellite 100 to the ground station transceiver 230 in the ground station 200. Likewise, an acknowledgement is sent from the ground station 200 via communication link 263 to the Iridium satellite 100 and via communication link 264 from the Iridium satellite 100 to the Iridium satellite transceiver 60 in the aircraft 50. The communication links 262 and 263, which are shown as separate communication links, are a single bidirectional wireless communication link. Likewise, the communication links 254 and 251 in FIG. 1 are the same bidirectional wireless communication links as communication links 262 and 263. The communication links 261 and 264, which are shown as separate communication links, are a bidirectional single wireless communication link. Likewise, the communication links 252 and 253 in FIG. 1 are the same bidirectional single wireless communication links as communication links 261 and 264.

Figure 6:
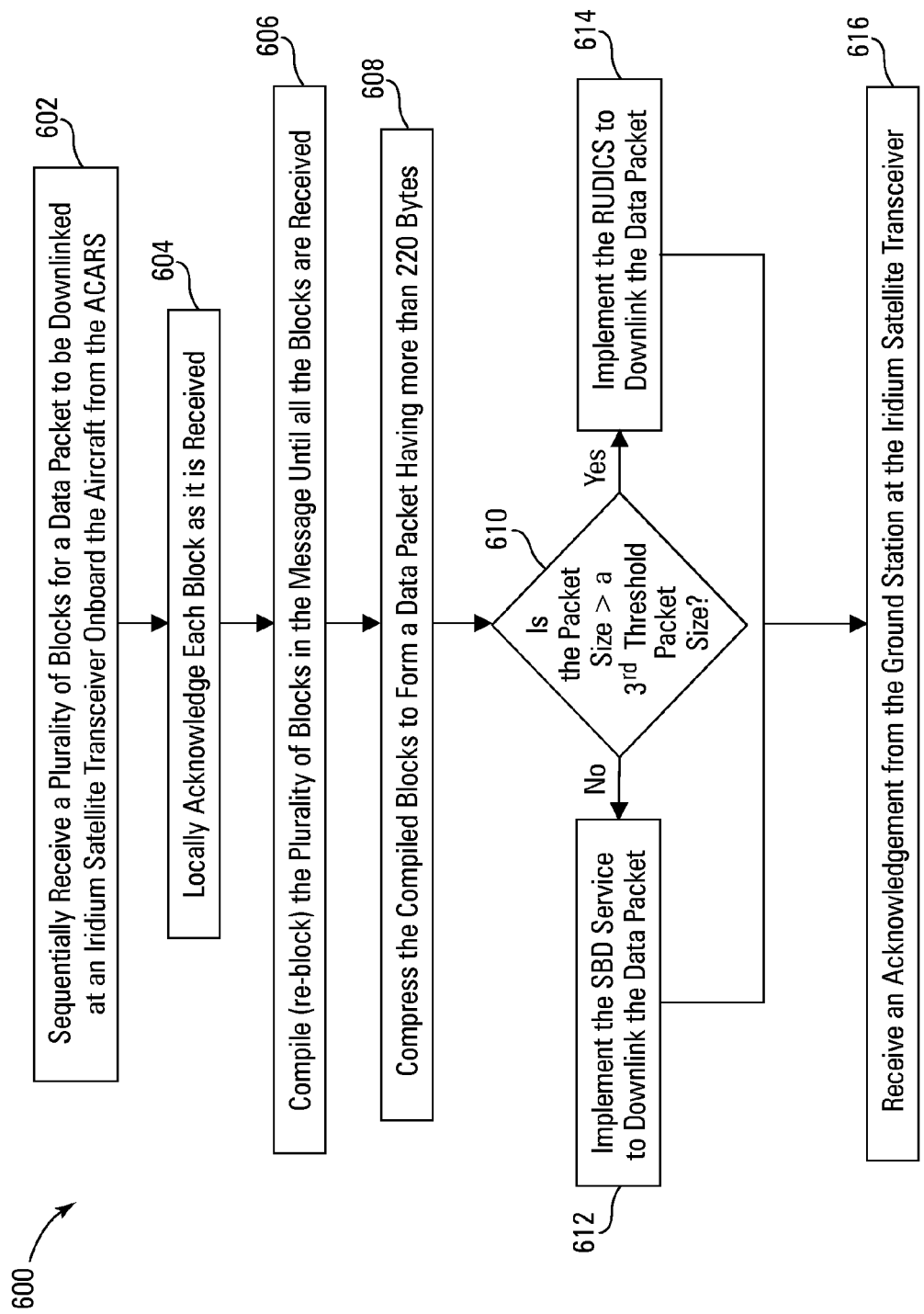
FIG. 6 is a flow diagram of a method to reduce latency in a data link communication while downlinking data packets of increased packet size from an ACARS in an aircraft to a ground station in accordance with an embodiment of the present invention.
Figure 7:
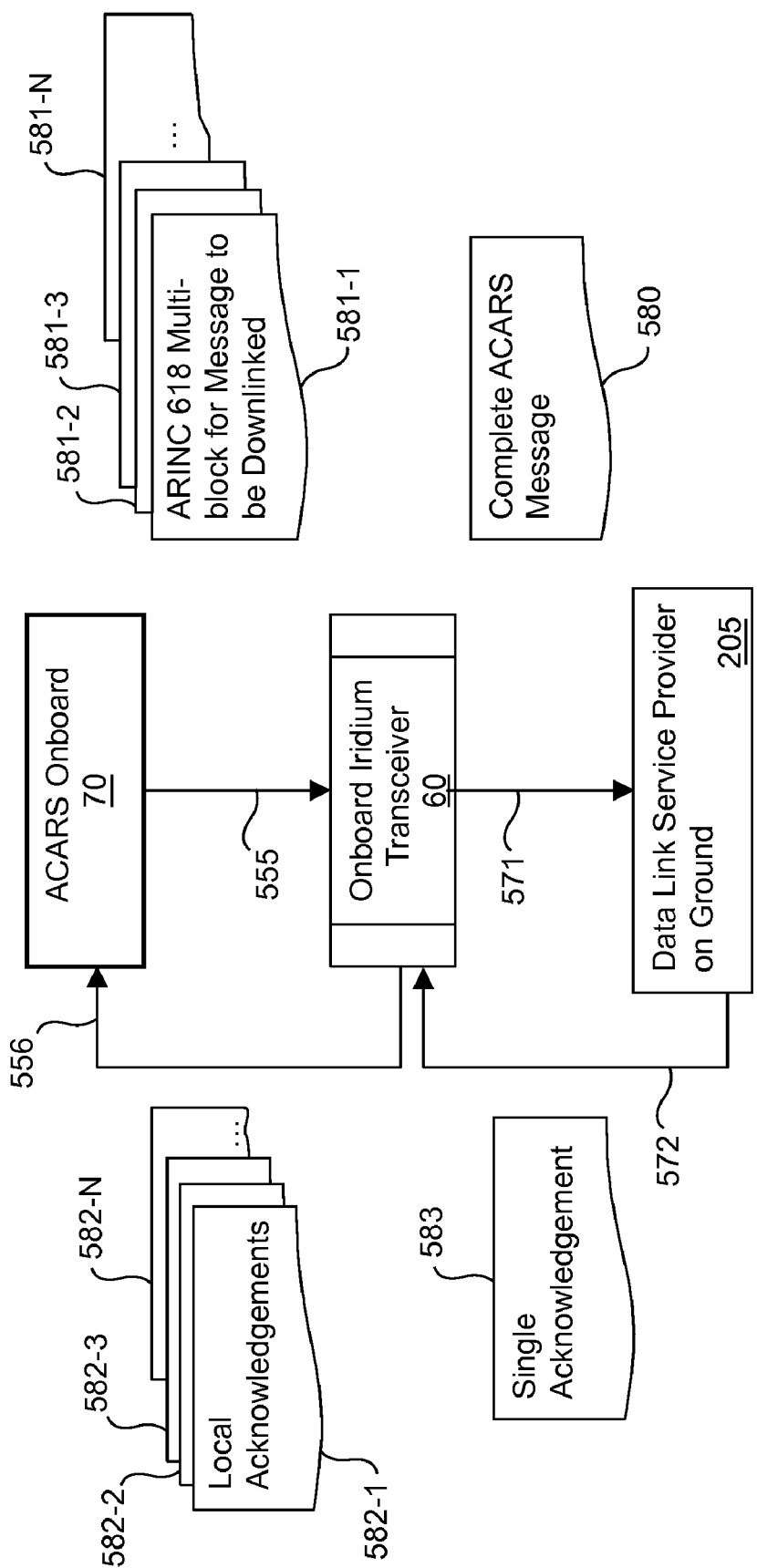
FIG. 7 shows a flow diagram for the downlink of messages and uplink of acknowledgements in the data link communication system in accordance with an embodiment of the present invention.

FIG. 6 is a flow diagram of a method 600 to reduce latency in a data link communication system 10 while downlinking data packets of increased packet size from an ACARS 70 in an aircraft 50 to a ground station 200 in accordance with an embodiment of the present invention. FIG. 7 shows a flow diagram for the downlink of messages 580 and uplink of acknowledgements 583 in the data link communication system 10 in accordance with an embodiment of the present invention. The method 600 is described with reference to FIG. 7 and the link communication system 10 shown in FIG. 5 although it is to be understood that method 600 can be implemented using other embodiments of the data link communication system as is understandable by one skilled in the art who reads this document.

At block 602, a plurality of blocks 581(1-N) (ARINC 618 multi-block for message to be downlinked) for a message to be downlinked are sequentially received at the Iridium satellite transceiver 60 onboard the aircraft 50 from the ACARS 70. The blocks 581(1-N) are also referred to herein as "packets 581(1-N)." The plurality of blocks 581(1-N) are each less than or equal too 220 bytes in length. The plurality of blocks 581(1-N) is sent via communication link 555 (FIG. 7) to the Iridium satellite transceiver 60. At block 604, the Iridium satellite transceiver 60 sends a local acknowledgement to the ACARS 70 for each block 581(1-N) as it is received. The local acknowledgements 582(1-N) are sent from the Iridium satellite transceiver 60 to the ACARS 70 via communication link 556 (FIG. 7).

At block 606, the plurality of blocks 581(1-N) in the message that are sequentially received from the ACARS 70 are compiled (also referred to herein as "re-blocked") at the Iridium satellite transceiver 60 until all the blocks 581(1-N) are received for the message to be downlinked. Each block 581(1-N) has a packet size less than or equal to 220 bytes and the re-blocked plurality of blocks form a data packet to be downlinked that has more than the first threshold packet size. In one implementation of this embodiment, the plurality of blocks 581(1-N) is stored in the memory 62 until all the blocks 581(1-N) are received and then the processor 65 compiles the plurality of blocks 581(1-N).

At block 608, the compiled blocks are compressed to form a data packet 580 to be downlinked. In one implementation of this embodiment, the compressed data packet 580 to be downlinked has a packet size greater than the first threshold packet size. In another implementation of this embodiment, block 608 is not implemented. The Iridium satellite transceiver 60 determines the packet size of the compressed data packet 580 to be downlinked. At block 610, the Iridium satellite transceiver 60 determines if the packet size of the compressed data packet 580 is greater than a third threshold packet size. In one implementation of this embodiment, the third threshold packet size is 1960 bytes. In another implementation of this embodiment, the third threshold packet size is different from 1960 bytes.

If the packet size of the compressed data packet 580 is less than or equal to the third threshold packet size, the flow proceeds to block 612. At block 612, the Iridium satellite transceiver 60 implements the short burst data service to downlink the compressed data packet 580 via an Iridium satellite 100. The downlinked data packet 580 can have a packet size greater than the first threshold packet size.

If the packet size of the compressed data packet 580 is greater than the third threshold packet size, the flow proceeds to block 614. At block 614, the Iridium satellite transceiver 60 implements the RUDICS data service to downlink the compressed data packet. In this case, the downlinked compressed data packet 580 has a packet size greater than the third threshold packet size.

At block 616, the Iridium satellite transceiver 60 receives an acknowledgement 583 from the ground station 200 after the ground station 200 receives the downlinked data packet 580. The Iridium satellite transceiver 60 segments the single acknowledgement 583 into a plurality of blocks 582(1-N). Each block 582-i is sequentially sent from the Iridium satellite transceiver 60 to the ACARS 70. Each of the blocks 582(1-N) is less than the first threshold packet size.

Figure 8:
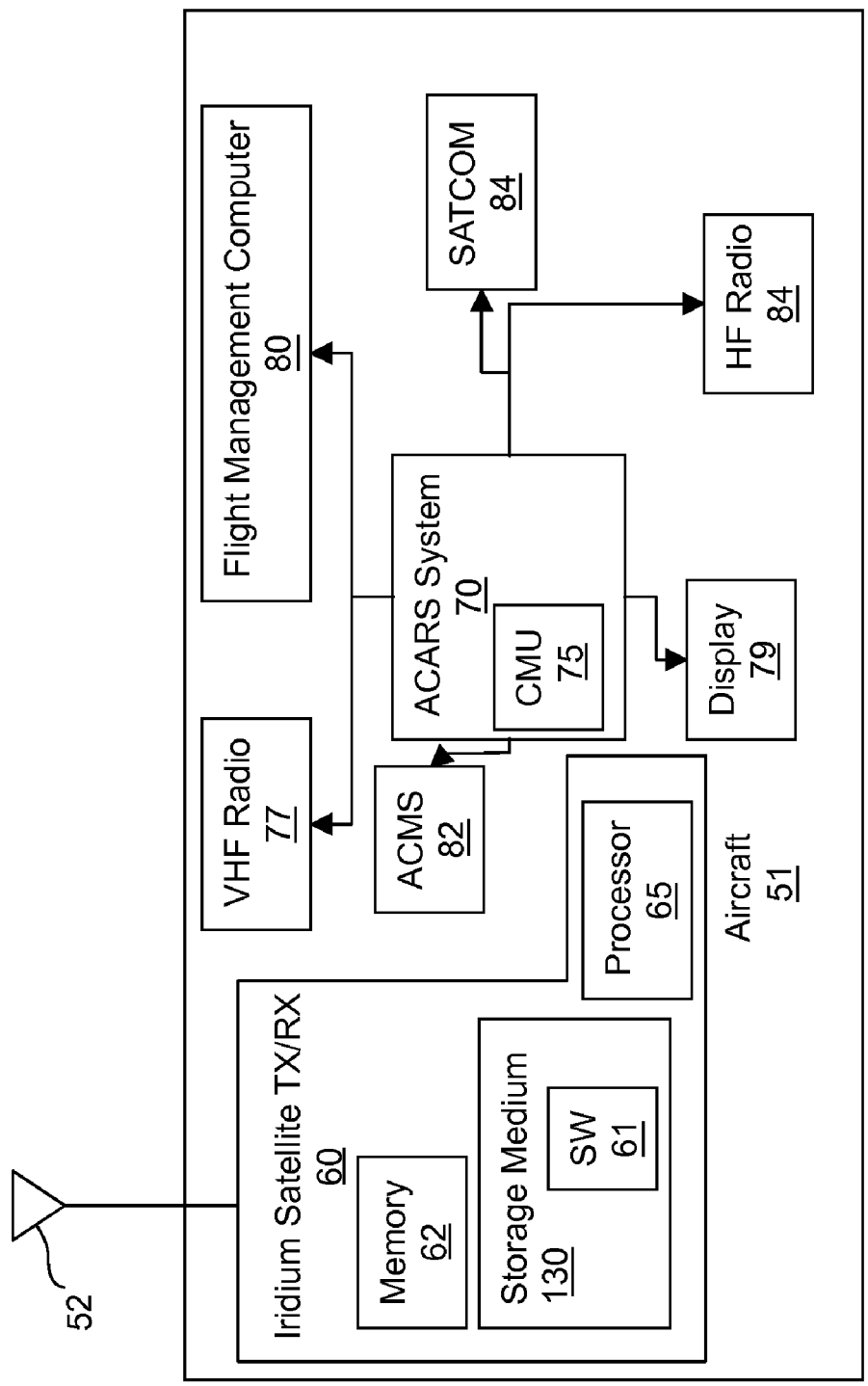
FIG. 8 shows an aircraft having an Iridium satellite transceiver and an ACARS in accordance with an embodiment of the present invention.

FIG. 8 shows an aircraft 51 having an Iridium satellite transceiver 60 and an ACARS 70 in accordance with an embodiment of the present invention. The aircraft 51 includes the Iridium satellite transceiver 60 communicatively coupled to an antenna 52 and the ACARS 70 as described above with reference to FIG. 1. As shown in FIG. 8, the communication management unit 75 in the ACARS 70 is communicatively coupled to a very high frequency (VHF) radio 77, a display 79 for the pilot, a flight management computer 80, aircraft condition monitoring system (ACMS) 82, satellite communications (SATCOM) 84, and a high frequency (HF) radio 84. In one implementation of this embodiment, a printer and a keyboard are communicatively coupled to the communication management unit 75. The aircraft 51 can be used to implement the methods 300, 400 and 600 in a system with the Iridium satellite 100 and a ground station 200 as is understandable by one skilled in the art reading this document.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to reduce latency in a data link communication, the method comprising:
compressing a data packet to be uplinked from a ground station to an aircraft-communications-addressing-and-reporting-system (ACARS) device in an aircraft, the aircraft-communications-addressing-and-reporting-system device configured to receive packets having a packet size less than or equal to a first threshold packet size;
determining a packet size of the compressed data packet;
when the packet size exceeds a second threshold packet size, transmitting the compressed data packet over an uplink via an Iridium-router-based-unrestricted-digital-inter-working-connectivity-solution-data service; and
when the packet size is less than or equal to the second threshold packet size, transmitting the compressed data packet over the uplink via a short-burst-data service.

2. The method of claim 1, further comprising:
receiving the uplinked compressed data packet having a packet size greater than the first threshold packet size at an Iridium satellite transceiver in the aircraft;
decompressing the received data packet;
multi-blocking the decompressed data packet into a plurality of blocks, wherein the packet size of each block is less than or equal to the first threshold packet size; and
sending the plurality of blocks to the aircraft-communications-addressing-and-reporting-system device onboard the aircraft.

3. The method of claim 2, further comprising:
sequentially receiving a local acknowledgement for each of the plurality of blocks at the Iridium satellite transceiver from the aircraft-communications-addressing-and-reporting-system device;
compiling the received local acknowledgements at the Iridium satellite transceiver; and
sending the compiled acknowledgements as a single acknowledgement to the ground station when the local acknowledgements for each of the plurality of blocks are compiled.

4. The method of claim 1, further comprising:
sequentially receiving a plurality of blocks for a data packet to be downlinked at an Iridium satellite transceiver onboard the aircraft from the aircraft-communications-addressing-and-reporting-system device; and
locally acknowledging each block as it is received.

5. The method of claim 4, further comprising:
compiling the plurality of blocks in the data packet until all the blocks are received;
compressing the compiled blocks to form a data packet to be downlinked;
determining a packet size of the compressed data packet to be downlinked;
when the packet size of the data packet to be sent over a downlink is greater than a third threshold packet size, transmitting the compressed data packet over the downlink via the Iridium-router-based-unrestricted-digital-inter-working-connectivity-solution-data service; and
when the packet size of the data packet to be sent over the downlink is less than or equal to the third threshold packet size, transmitting the compressed data packet over the downlink via the short-burst-data service.

6. A system to enhance data link communication, the system comprising:
an aircraft-communications-addressing-and-reporting-system (ACARS) device onboard an aircraft, the aircraft-communications-addressing-and-reporting-system device configured to receive packets having a packet size less than or equal to a first threshold packet size;
an Iridium satellite transceiver onboard the aircraft, the Iridium satellite transceiver communicatively coupled to the aircraft-communications-addressing-and-reporting-system device and configured to transmit via one of an Iridium-router-based-unrestricted-digital-inter-working-connectivity-solution-data service (RUDICS) or a short-burst-data (SBD) service, the transmission being based on a packet size of a received data packet, the Iridium satellite transceiver including a processor to execute software to:
decompress an uplinked data packet; and
if the decompressed uplinked data packet has a packet size greater than the first threshold packet size, multi-block the decompressed uplinked data packet into a plurality of blocks, each block having less than the first threshold packet size, wherein the Iridium satellite transceiver sequentially sends the plurality of blocks to the aircraft-communications-addressing-and-reporting-system device.

7. The system of claim 6, further comprising at least one ground station communicatively coupled to the Iridium satellite transceiver via an Iridium satellite.

8. The system of claim 7, wherein the ground station comprises:
a data link service provider;
a ground station transceiver communicatively coupled to the data link service provider; and a processor communicatively coupled to the data link service provider.

9. The system of claim 8, wherein the data link service provider comprises a storage medium holding software executable by the processor to compress data packets to be uplinked and decompress data packets to be downlinked, and, when a packet size of a compressed data packet is less than or equal to a second threshold packet size, the processor is configured to transmit the compressed data packet via an uplink via short-burst-data service, and, when the packet size of the compressed data packet is greater than the second threshold size, the processor is configured to transmit the compressed data packet over the uplink via Iridium-router-based-unrestricted-digital-inter-working-connectivity-solution-data service.

10. The system of claim 6, wherein the Iridium satellite transceiver is configured to receive local acknowledgements for each of the plurality of blocks from the aircraft-communications-addressing-and-reporting-system device.

11. The system of claim 10, wherein the processor compiles the acknowledgements by executing software to re-block the local acknowledgements received from the aircraft-communications-addressing-and-reporting-system device to form a single acknowledgement.

12. The system of claim 11, wherein the Iridium satellite transceiver is configured so that, when the packet size of the single acknowledgement is greater than a third threshold packet size, the Iridium satellite transceiver transmits the acknowledgement over the downlink via the Iridium-router-based-unrestricted-digital-inter-working-connectivity-solution-data service to downlink the acknowledgement.

13. The system of claim 12, wherein the Iridium satellite transceiver is configured so that when the packet size of the data packet is less than or equal to the third threshold packet size, the Iridium satellite transceiver transmits the data packet over the downlink via the short-burst-data service.

14. The system of claim 6, the Iridium satellite transceiver comprising:
a storage medium holding software executable by the processor; and
a memory to store thresholds.

15. A method to reduce latency in a data link communication, the method comprising:
determining a packet size of a data packet to be uplinked from a ground station to an aircraft-communications-addressing-and-reporting-system (ACARS) device in an aircraft, the aircraft-communications-addressing-and-reporting-system device configured to receive packets having packet size less than or equal to a first threshold packet size;
when the packet size is less than or equal to a second threshold packet size, transmitting the data packet over an uplink via a short-burst-data service; and
when the packet size is greater than the second threshold packet size, transmitting the data packet over the uplink via an Iridium-router-based-unrestricted-digital-inter-working-connectivity-solution-data service.

16. The method of claim 15, further comprising:
receiving the uplinked data packet having a packet size greater than the first threshold packet size at an Iridium satellite transceiver in the aircraft;
multi-blocking the uplinked data packet into a plurality of blocks, wherein the packet size of each block is less than or equal to the first threshold packet size; and
sending the plurality of blocks to the aircraft-communications-addressing-and-reporting-system device onboard the aircraft.

17. The method of claim 16, further comprising:
sending a local acknowledgement for each uplinked block from the aircraft-communications-addressing-and-reporting-system device onboard the aircraft to the Iridium satellite transceiver;
compiling the received local acknowledgements at the Iridium satellite transceiver; and
sending the compiled acknowledgements as a single acknowledgement to the ground station when an acknowledgement is received at the Iridium satellite transceiver for each of the plurality of blocks.

18. The method of claim 15, further comprising:
sequentially receiving a plurality of blocks for a data packet to be downlinked at an Iridium satellite transceiver onboard the aircraft from the aircraft-communications-addressing-and-reporting-system device; and
locally acknowledging each block as it is received from the aircraft-communications-addressing-and-reporting-system device.

19. The method of claim 18, further comprising:
compiling the plurality of blocks for the data packet to be downlinked;
determining the packet size of the data packet to be downlinked;
when the packet size of the data packet to be sent over a downlink is greater than a third threshold packet size, transmitting the data packet over the downlink via the Iridium-router-based-unrestricted-digital-inter-working-connectivity-solution-data service; and
when the packet size of the data packet to be sent over the downlink is less than or equal to the third threshold packet size, transmitting the data packet over the downlink via the short-burst-data service.

20. The method of claim 15, further comprising:
compressing the data packet to be uplinked from the ground station to the Iridium satellite transceiver;
decompressing the uplinked compressed data packet received at the Iridium satellite transceiver;
compressing a data packet to be downlinked from the Iridium satellite transceiver to the ground station; and
decompressing the downlinked compressed data packet received at the ground station.

* * * * *